2,853,208

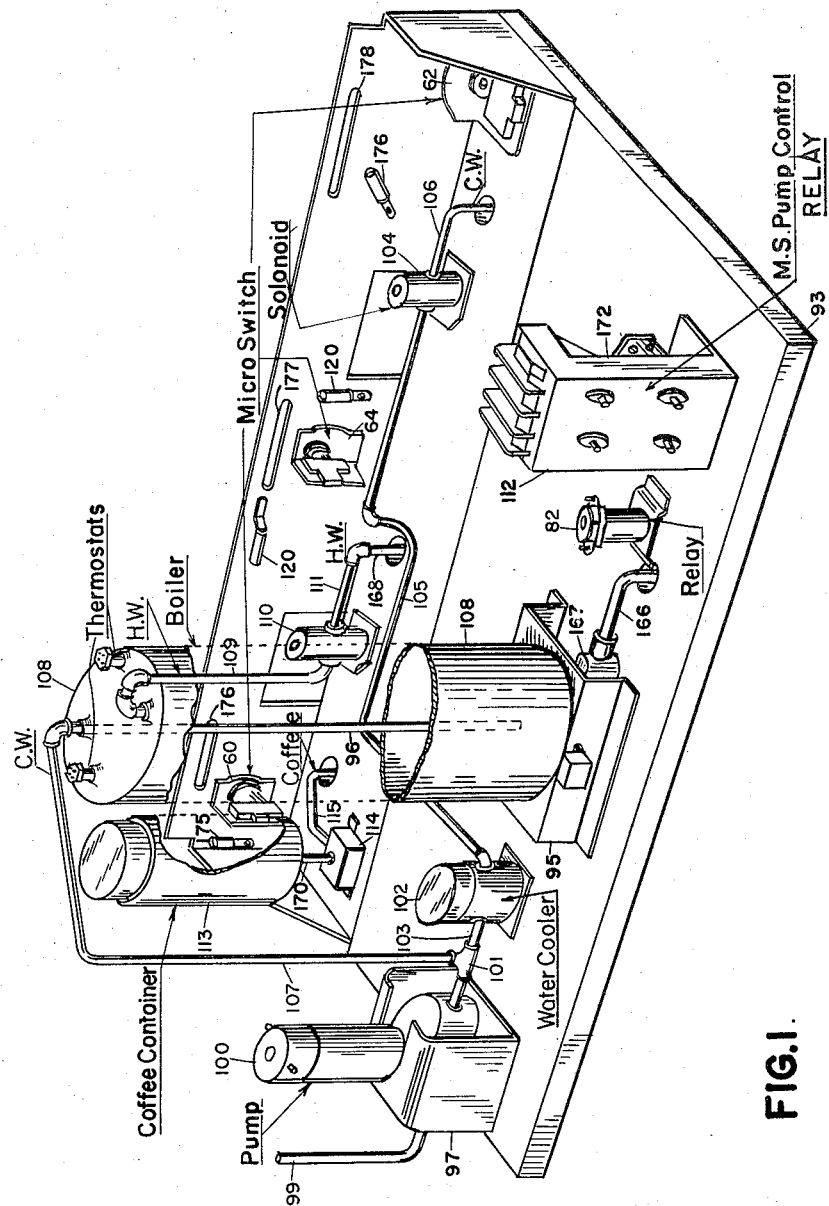

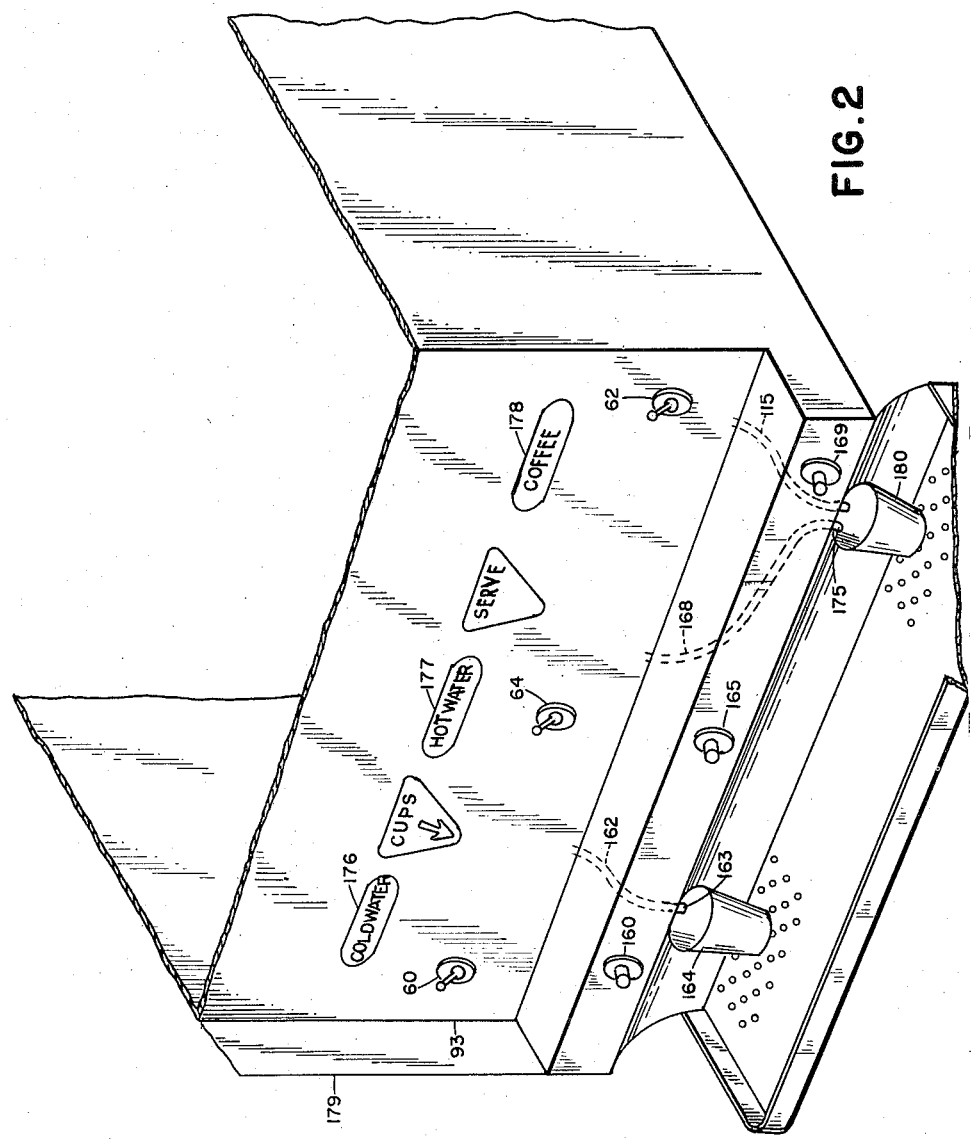

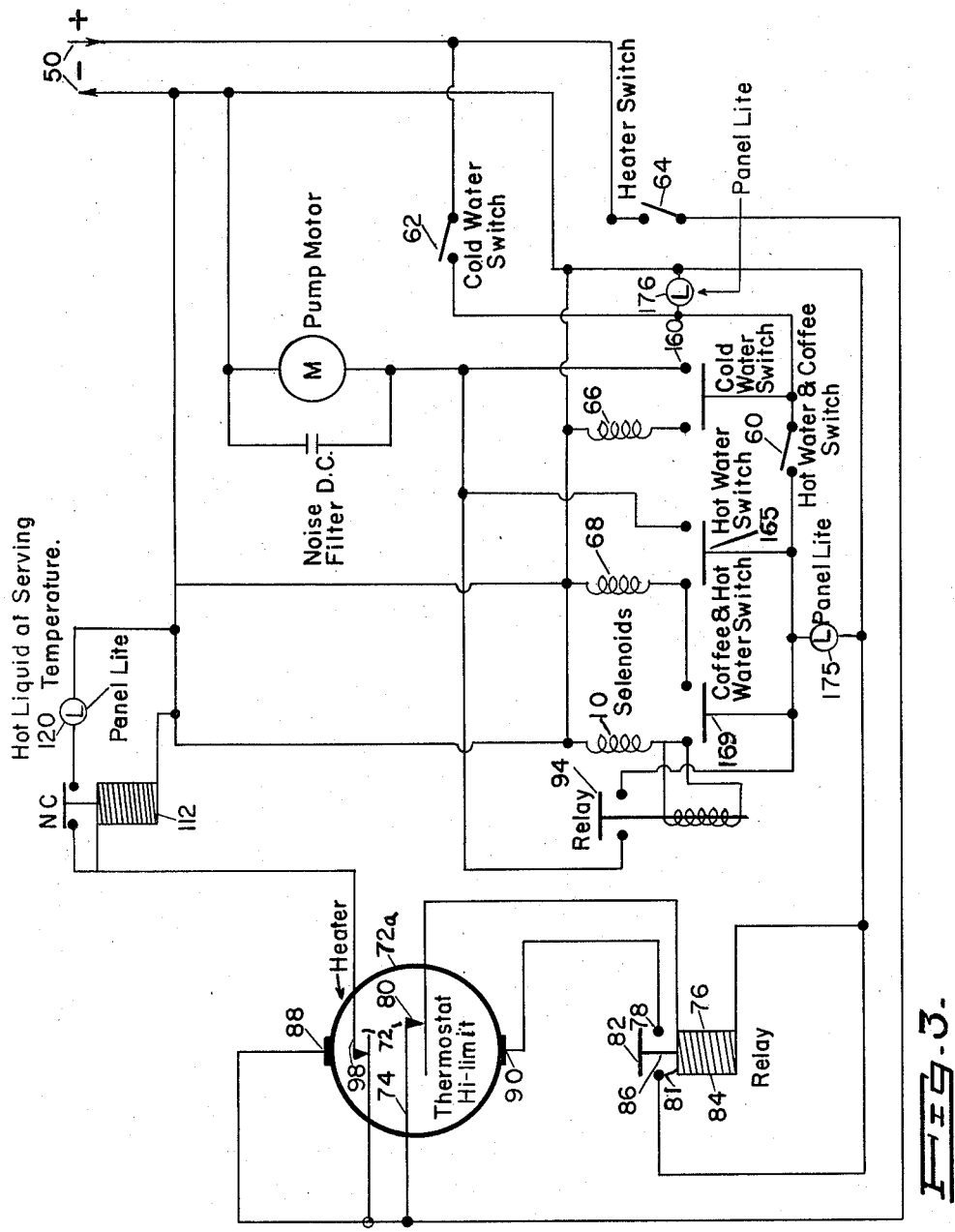

LIQUID DISPENSING MACHINE

David L. Paulding, Massapequa Park, N. Y., assignor to REF Manufacturing Corporation, Mineola, N. Y., a corporation of New York Application September 24, 1956, Serial No. 611,559

8 Claims. (Cl. 222—76)

This invention relates to improvements in fluid liquid dispensing machines and in more particular to novel means and apparatus for instantly making and dispensing coffee, hot water liquids, carbonated liquids, and the like.

It is an object of the present invention to provide a very efficient, practical, economical coffee and other liquids dispensing apparatus.

It is a further object of the present invention to provide dispensing outlets having a common area of accessibility.

Still another object of this invention is to provide novel and improved waste disposal means for said coffee maker.

Various further and more specific objects, purposes, features and advantages will clearly appear from the detailed description given below taken in connection with the accompanying drawings which form a part of this specification and illustrate merely by way of examples certain embodiments of the device of this invention.

The invention consists in such novel features, arrangements and combination of parts as may be shown and described in connection with the apparatus herein disclosed by way of example only and as illustrative of a preferred embodiment.

In the following description and in the claims, parts will be identified by specific names for convenience, but such names are intended to be as generic in their application to similar parts as the art will permit. Like reference characters denote like parts in the several figures of the drawing.

In the drawings:

Fig. 1 and Fig. 2 show isometric views of the coffee making and dispensing apparatus. The configuration and parts can be varied to suit the application.

Fig. 3 shows a wiring diagram of the control system of the coffee making and liquid apparatus.

Referring now more particularly to the drawing in Fig. 1, the coffee making and dispensing unit 93 provides a system whereby cold water via conduit 99 is gravity fed to pump 100 which causes the cold water to flow, under pressure, to the various parts of the liquid dispensing system. Upon leaving the pump 100, said pump being supportable by a structural member 97, the cold water enters a T-section 101 and divides into a dual path, a first path entering a liquid cooler 102 via conduit 103 where the water is chilled or refrigerated either by ice and the like or by electro-mechanical means. The ice water leaves cooler 102 and flows through a solenoidally controlled valve 104 via conduit 105, and finally exits into a receptacle for the purpose of receiving the chilled water via conduit 106. The second path for flow of cold water after leaving T-section 101 is through conduits 107, 96 and into the boiler 108 where the water becomes heated, the said boiler being supported by a channel shaped base member 95. The heated water leaves boiler 108 via conduit 109 and flows into the solenoidally operated valve 110 and out via conduit 111 into a waiting receptacle substantially the same as that previously explained with reference to the cold water flow. To facilitate the ascertainment of correct serving temperature of the hot water, a thermostatically controlled relay 112 and having a base 172, is made to control the operation of a panel light 120 so that when the water in the boiler is up to the correct serving temperature the panel light will go on. A pair of bimetallic contacts 98 of the thermostat 72 are so adjusted that when the liquid temperature is up to the proper serving temperature the contacts complete the circuit through the relay 112 to cause the said relay to operate thereby causing indicator light 120 to go on. This novel feature avoids the necessity of trial and error in deciding when the hot water is at the correct serving temperature. Finally the coffee liquid concentrate in container 113 is gravity fed via solenoidally operated valve 114 and conduit 115 to an external receptacle where it is dispensed. The addition of the liquid cooler makes it possible to provide, not only ice water, but ice coffee as well whenever the desire for it should occur. It is also possible to provide said cooler with means for carbonating the cold water in accordance with well known methods either by providing a separate unit apart from the liquid cooler unit, or by combining the carbonated and refrigerated parts in a single unit.

The liquid dispensing system is controllable by a group of selector switches or pushbuttons mounted to the front panel shown in Fig. 2.

Now referring to Fig. 2, it can be seen that cold water may be dispensed by the apparatus herein described by impressing a normally open selector switch 160, said switch actuating a solenoidally operated valve 104 and the pump motor 100 simultaneously therewith, to selectively select the cold water from the path of flow 105. The water flows under pressure from the pump 100, valve 104 and then in a downward direction through conduit 106, and finally through an outlet conduit 162, terminating in outlet 163, making free and easy access thereto by some liquid retainer 164, beaker, cup and the like.

In a similar manner as to selection, hot water may be selectively selected by the impression of selector switch 165. This switch 165 actuates solenoidally operated valve 110, which is similar to valve 104. However, the hot water flow path traverses another path after the cold water emanates from pump 100. The cold water traverses a conduit path 107 through a heating reservoir or boiler 108, said boiler having thermostatically controlled heating to control the temperature of the water emanating therefrom. To provide for overflow in the boiler tank or reservoir 108, a conduit path 166 is provided leading from the bottom of said tank in a vertical downward direction, the said path terminating in a refuse tank, not shown. Conduit means including a drain valve 167 are also provided at the base portion of said reservoir to drain off any liquid therein to some refuse tank or container for the purpose. The heated water then flows through conduit 109, into the valve 110 and out thereof and finally through conduit 111 to the outlet conduit 168, the said outlet conduit terminating at a point 175 remote from said cold water termination portion of the coffee maker 98.

The coffee selector switch 169 actuates the hot water flow system in a similar manner as the hot water selection switch, but in addition provides for the inter-mixture of concentrated liquid coffee and hot water as previously supplied. The actuation of selector switch 169, not only causes the operation of valve 110 but simultaneously therewith operates solenoidally operated valve 114, the said valve 114 providing for metered dispensing of concentrated liquid coffee which is stored in storage means 113. The operation of normally open selector switch 169 causes the flow of both concentrated liquid coffee and hot water in accordance with predetermined fixed volumes so that the amount of coffee emanating from the dispenser does not change its concentration content with changing volume. The coffee concentrate traverses conduit 170 in its flow path, through outlet conduit 115, and terminates in the same general area as the hot water termination of the coffee dispenser. Simultaneously with the coffee concentrate flow, hot water traverses the path as described previously so that both concentrate and hot water are available at the same dispensing area 175.

The system further permits the dispensing of cold liquids without interfering with the dispensing of hot liquids and coffee.

Fig. 3 is an electrical control diagram of the coffee dispensing machine 1. A source of energy 50 is desired from some available supply means and preferably a 28 volt direct current or 115 volts A. C., 400 cycles system available on standard commercial aircraft.

The operation of the system, as gleaned from the control diagram of Figure 2, functions as follows: to place the boiler in operation, heater toggle switch 64 is closed, this completes the circuit from the potential source 50 through the heater 72a and return where the electromagnetic relay 82 is in its closed positions as determined by the thermostatic element 74, 80. When the elements are closed, e. g. when contacts 74, 80 are in electrical contact, pole-piece 86 bridges contacts 78, 81 to complete the circuit from source 50 through the heater element 72a via its contact electrodes 88, 90. The second thermostatic element 98 controls a pilot lamp 120 through a normally closed electromagnetic relay 112 and indicates when the hot liquid is at serving temperature.

To cause the flow of cold water, cold water toggle switch 62 must first be closed, then selector switch 160 is impressed, this causes solenoid coil 66 of solenoid operated valve 104 to become energized thus causing valve 104 to function. Simultaneously with the operation of valve 104 the pump 100 is operated to set the cold water flowing through its proper conduit path.

To cause the flow of hot water, hot water and coffee toggle switch 60 must first be closed. For this switch to be operative, the cold water switch 62 must first be closed to complete the electrical conductive path, said path comprising both switches in series relation. As selector switch 165 is impressed coil 68 is energized to cause valve 110 to function in a manner comparable to valve 104 thereby permitting the hot water to traverse a conduit flow path as previously described. Simultaneously with the operation of switch 165, the pump 100 is made to function, the said pump being the driving force which causes the fluid to flow.

Coffee selector switch 169 causes both solenoid coils 68 and 10 to operate simultaneously thus permitting valves 114 and 110 to concurrently operate. This permits intermixing of both concentrated liquid coffee and hot water in pre-determined fixed volumes. The pump motor is cause to operate by exciting relay 94 when switch 32 is made to operate as above.

Referring again to Fig. 1, the operation of switch 169 permits coffee concentrate to traverse one flow path and hot water to traverse another flow path with both liquids egressing from their respective conduits 115, 168 into some receptacle 180 at the accessible area 163.

Referring now once again to control diagram in Fig. 3, it is noted that toggle switches 60, and 62 are operatively in series as to electrical continuity. However, by making inoperative, coffee and hot water toggle switch so that neither coffee or hot water or both are available will not prevent the availability of cold water when the cold water toggle switch is in its operative position. This means persons who want to avail themselves of a source of cold water can do so without subjecting themselves to the hazard of scalding due to the possibility of erroneously choosing the wrong selector switch. The operation of switches 60, and 62 will excite panel lights 175 and 176 respectively to show the system is in an operable state for dispensing the indicated liquids, the lights being viewable through slotted portions 176, 177, and 178.

Having thus described my invention, what I claim is:

1. A liquid dispensing machine for dispensing a plurality of liquids comprising a common source of liquid supply, means operable to place said liquid under pressure, means to conduct said liquid under said pressure along a plurality of divergent paths, means to treat the liquid in said paths to change its characteristics, valve means operable to permit the dispensing of liquid under pressure selectively from said paths, and electrical means to operate said valve means to permit liquid to be dispensed from selected ones of said plurality of paths and simultaneously to operate said means to put said liquid under pressure to dispense the liquid from said selected certain ones of said paths.

2. In a machine for dispensing a plurality of liquids of different characteristics, a common liquid supply for said plurality of liquids to be dispensed, conduits receiving said common liquid to conduct the liquid along different paths, means to change the characteristics of the liquid in said paths, pump means operable to place the liquid under pressure, valve means controlling said different paths and operable to select at least one of said paths to permit the liquid to be dispensed therefrom, and electrical means connected to said valve means and pump means to selectively operate said valve means to permit at least a selected one of said paths to dispense liquid and to operate said pump means to place the liquid in said selected path under pressure.

3. In a machine for dispensing a plurality of liquids of different characteristics from different outlets, a common source of liquid supply, common conduit means to convey the liquid from said common source of supply, a plurality of separate conveying means receiving said liquid from said common conduit means to convey the same along a plurality of separate paths, means in each of said paths to change the characteristics of the liquid therein, each of said paths having an outlet from which the liquid therein may be dispensed, valve means in each one of said plurality of paths operable to permit the liquid to be dispensed from its respective outlet, pump means operable to place the liquid in said common conduit under pressure, switch means to selectively operate a selected one of said valve means to select the respective path from which the liquid therein may be dispensed, and electrical means connecting said switch means with each of said valve means and said pump means to operate said pump means with said selected valve means to place the liquid in said common conduit means and said selected path under pressure.

4. In a machine for dispensing liquids of different characteristics, separate conduit means for each one of said different liquids and each of said separate conduit means including an outlet through which the respective liquid therein may be dispensed, a common liquid conduit connected with each of said separate conduit means to supply a common liquid thereto, means connected with certain of said separate conduit means to change the characteristics of said common liquid supplied thereto, pump means connected with said common conduit and operable to place the liquid therein under pressure, valve means to control the dispensing of liquid from each of said separate conduit means and operative to select certain of said separate conduit means to dispense liquid therefrom, and an electrical circuit including selector switch means, said electrical circuit connecting said switch means in series with said valve means and pump means to selectively operate said valve means to permit liquid to be dispensed from certain selected ones of said separate conduit means and to operate said pump means to place the liquid in said common conduit under pressure.

5. In a machine for dispensing a plurality of liquids from a plurality of liquid conduits, an electrical circuit therefor comprising a source of electricity, electrically operated valve means for controlling the dispensing of liquids from each of said conduits, pump means connected in series with said valve means and operable to place the liquid in said conduits under pressure, switch means for closing a circuit to said valve means to selectively dispense liquid from a desired one of said conduits and simultaneously to operate said pump means, and a master switch in series with said selectively operable switch means to connect the same with said source of electricity.

6. In a machine as in claim 5, and means to convey liquid to said plurality of liquid conduits from a common source of liquid suply.

7. In a machine for dispensing hot and cold liquids, separate hot and cold liquid conduits for each of said liquids, an electrical circuit including an electrically operated valve for each one of said circuits, a pump operable to place the liquid in each conduit under pressure and connected in series with each one of said valves to operate simultaneously therewith, a source of electricity, a plurality of selectively operated series connected selector switches, each one of said selector switches being connected for selective operation of a respective one of said valves, and a master switch to connect said selector switches with said source of electricity.

8. In a machine as in claim 7, a heater in said hot liquid conduit to heat the liquid therein, a normally open heater circuit connecting said heater with said source of electricity, a normally closed thermostat in said heater circuit to control the operation of said heater, a normally open solenoid operated switch connected between said thermostat and heater to close the circuit to said heater when said thermostat is closed, and a main switch operable in said heater circuit to connect said heater with said source of electricity.

References Cited in the file of this patent

UNITED STATES PATENTS

| | | |
|---|---|---|
| 2,040,094 | McJoynt | May 12, 1936 |
| 2,160,285 | Routh | May 30, 1939 |
| 2,663,487 | Jahan et al. | Dec. 22, 1953 |
| 2,682,984 | Melikian et al. | July 6, 1954 |
| 2,767,960 | Fast | Oct. 23, 1956 |
| 2,776,074 | St. Laurence | Jan. 1, 1957 |
| 2,784,879 | Fischer | Mar. 12, 1957 |